(12) United States Patent
Williams

(10) Patent No.: US 7,980,562 B2
(45) Date of Patent: Jul. 19, 2011

(54) SEAL ARRANGEMENT

(75) Inventor: David S Williams, Chesterfield (GB)

(73) Assignee: Rolls-Royce PLC, London (GB)

( * ) Notice: Subject to any disclaimer, the term of this patent is extended or adjusted under 35 U.S.C. 154(b) by 298 days.

(21) Appl. No.: 11/808,849

(22) Filed: Jun. 13, 2007

(65) Prior Publication Data
US 2008/0007010 A1 Jan. 10, 2008

(30) Foreign Application Priority Data

Jul. 10, 2006 (GB) .................................. 0613630.3

(51) Int. Cl.
*F16J 15/44* (2006.01)
(52) U.S. Cl. ........................................................ 277/355
(58) Field of Classification Search .................. 277/355
See application file for complete search history.

(56) References Cited

U.S. PATENT DOCUMENTS

| | | | | |
|---|---|---|---|---|
| 5,135,237 A | * | 8/1992 | Flower | 277/355 |
| 6,173,962 B1 | | 1/2001 | Morrison et al. | |
| 6,267,381 B1 | * | 7/2001 | Wright | 277/355 |
| 6,840,518 B2 | * | 1/2005 | Boston | 277/355 |
| 7,066,468 B2 | * | 6/2006 | Uehara et al. | 277/355 |
| 2006/0214378 A1 | * | 9/2006 | Zheng | 277/355 |

FOREIGN PATENT DOCUMENTS

| | | |
|---|---|---|
| EP | 0 945 654 A2 | 9/1999 |
| EP | 1 180 623 A2 | 2/2002 |
| EP | 1 308 655 A2 | 5/2003 |
| EP | 1 653 129 A1 | 5/2006 |
| JP | A-2004-162569 | 6/2004 |
| WO | WO 03/089801 A1 | 10/2003 |
| WO | WO 2006/104514 A2 | 10/2006 |

OTHER PUBLICATIONS

European Search Report issue in European Application No. EP 07 252379 dated Jan. 27, 2011.

* cited by examiner

*Primary Examiner* — Vishal Patel
(74) *Attorney, Agent, or Firm* — Oliff & Berridge, PLC

(57) ABSTRACT

Seal arrangements utilizing leaf seal elements are susceptible to excessive wear at their tips due to blow-down pressures. When the seal element is forced against a rear surface across the pressure differential between the sides A, B of an arrangement. These tips may be forced into engagement with the rotating shaft and therefore wear on the shaft as well as at the tip occurs. By providing channels which extend laterally across more than one seal element pressure relief is maintained and therefore a limit to blow-down force maintained. The channels also extend radially and normally on a low pressure side of the seal arrangement.

15 Claims, 3 Drawing Sheets

SEAL ARRANGEMENT

BACKGROUND

The present arrangement relates to seal arrangements and more particularly to seal arrangements utilised with respect to rotating shafts and the like and formed from leaf elements or bristles.

Provision of appropriate seal arrangements in machinery such as gas turbine engines is important in order to separate operational stages within that machinery and for other reasons. The seal arrangements must be efficient but also have sufficient durability for acceptable operational periods before replacement and/or maintenance. It is known to provide brush seals which comprise bristles which extend towards a rotating shaft in operation in order to provide a seal between one side of the shaft and the other. The bristles through their tips rest or more normally ride slightly above the surface of the rotating shaft on a marginal leakage flow in order to create a seal. More recently, leaf seals have been developed which comprise leaf elements typically in the form of flexible metal tabs which extend towards the rotating shaft such that bottom tip edges of the tabs are again adjacent to the surface of the rotating shaft in order to create a seal. It will be understood that it is the tips of the bristles or edges of the leaf elements which determine the sealing effect but generally a degree of flexibility must be provided to take account of shaft misalignment and deviations in rotation due to imbalance such as a result of torque loading or otherwise. In such circumstances, as much control as possible of the bristles or leaf elements in order to maintain the appropriate presentation of these bristles or elements to the shaft is desirable.

SUMMARY

Prior art FIG. 1 illustrates a typical leaf seal arrangement 1. The arrangement 1 is associated with a rotor 2 which rotates in the direction of arrowhead 3. In such circumstances, leaf elements 4 have a lay angle to the rotor 2 in order to provide a sealing effect. The seal elements 4 are spaced from each other by spacer members 5 within a housing formed by a backing member 6 and respective plates 7, 8. It will be appreciated that one side, that is to say front plate 7 will be a high pressure side A whilst another side B will be a low pressure side. It will be appreciated due to the rotation of the rotor 2 in the direction of arrowhead 3 as well as the pressure differentials between sides A, B that anaerodynamic blow-down effect is generated presenting the elements 4 appropriately to the rotor 2.

The aerodynamic blow-down forces are illustrated in prior art FIG. 2. Similar reference nomenclature has been utilised to that used in prior art FIG. 1 for comparison in prior art FIG. 2. Thus, the leaves 4 are generally designed to allow the leaves 4 to blow down towards the rotor 2 to effect a good seal. This blow-down effect is created by use of aerodynamic forces to generate air flows 9 passing through the seals 4. However, if the blow-down forces generated are too large there will be excessive wear of tip edges 10 or of a surface of the rotor 2 engaged by the tip edges 10. In either event there may be premature failure of the seal arrangement or at least shorter periods of acceptable operational performance requiring preventative maintenance and repair. Excessive blow-down forces are due to rearward axial movement of the leaves 4 generally as a result of increasing pressure drop from the high pressure side A to the low pressure side B. Typically, once the leaves 4 move sufficiently rearward to contact the rear cover plate 8, there is then a step change in blow-down force since all air flow passing through the seal then acts to blow the leaves down.

In accordance with aspects of the present invention there is provided a seal arrangement comprising a housing and a plurality of leaf seal members, the housing comprising at least one plate adjacent a lower pressure region, at least a portion of each leaf seal member extending into the housing, the plate defining at least one channel extending laterally across, and associated with, more than one leaf seal member, the channel in flow communication with the lower pressure region at the distal end to the housing.

Generally, the leaf seal members are angularly presented.

Typically, the channel is curved. Alternatively, the channel extends radially. Possibly, the channel incorporates annular parts. Possibly the annular parts comprise complete annular rings in the housing.

Generally, the channel has an angle in an opposed direction to an angle of the leaf seal members. Possibly, the channel and the leaf seal members are arranged to lay across each other at a desired angle. Typically, the desired angle is 90°.

Possibly, the channel has a variable depth. Possibly, the channel has a variable depth along its length and/or across its width.

Possibly, the channel has a variable width.

Generally, the channel is located in a rearward plate of the housing.

Possibly, the channel has a lip edge.

In accordance with aspects of the present invention there is provided a turbine engine incorporating a seal arrangement.

BRIEF DESCRIPTION OF THE DRAWINGS

Embodiments of the present invention will now be described by way of example only with reference to the accompanying drawings in which.

DETAILED DESCRIPTION OF EMBODIMENTS

As indicated above, excessive blow-down forces cause premature wearing of the tips of seal members or elements. Those seal elements may comprise leaves or bristles in a brush seal. In either event, limitation of the blow-down force would be advantageous. Generally, before the leaf elements are in contact with the rear cover in a housing it will be understood that a gap is provided between those seal elements and the housing through which air can escape between the trailing edges of the leaves and the rear cover plate resulting in a much lower blow-down force acting upon the leaves. In such circumstances the present invention specifically provides pressure relief channels such that the channels provide for leakage escape even when the seal elements contact the rear, that is to say low pressure side plate in a seal arrangement.

Figure 1:
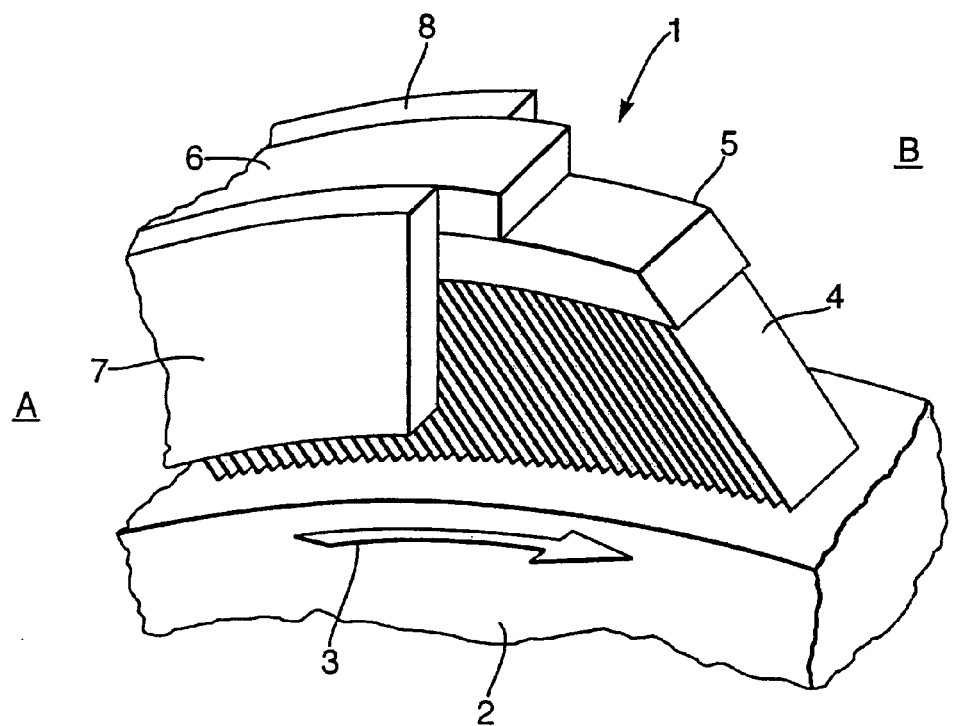
FIG. 1 is a schematic perspective view of a typical seal arrangement in accordance with prior art.
Figure 2:
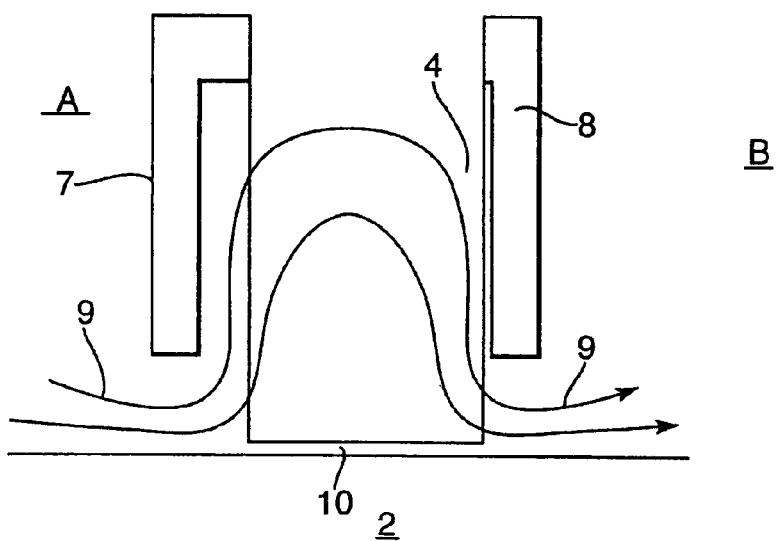
FIG. 2 is a front view of aerodynamic blow-down forces in accordance with prior art.

FIG. 1 provides a schematic perspective view of part of a seal arrangement in accordance with aspects of the present invention. Thus, the arrangement 10 comprises a plate 11 in which a channel 12 is provided in a facing surface 13 of the plate 11. The channel 12 is formed by any appropriate means including chemical etching, electro-discharge machining or milling dependent upon required size and profile for the channel 12. Seal elements in the form of leaves 14 are provided adjacent to the surface 13 and the channel 12. It will be appreciated in a practical seal arrangement the plate 11 will extend in an annular ring and a multiplicity of seal elements will be presented in front of that plate 11 and another plate 7, on the other side with a backing ring on top in a similar fashion to that illustrated in prior art FIG. 1.

In use, as indicated above, the seal elements 14 will be manipulated by air flows across the arrangement. The elements 14 are deflected by the blow-down forces such that there is contact with the plate 11 then the channel 12 will still provide a pressure relief gully to avoid generation of excessive blow-down forces as a result of such rearward axial movement of the elements 14. It will be understood that generally the plate 11 will incorporate a sufficient number of channels 12 such that each seal element 14 is at least associated with one channel 12. The channel 12 generally has a lateral portion which extends laterally across more than one seal element.

Figure 3:
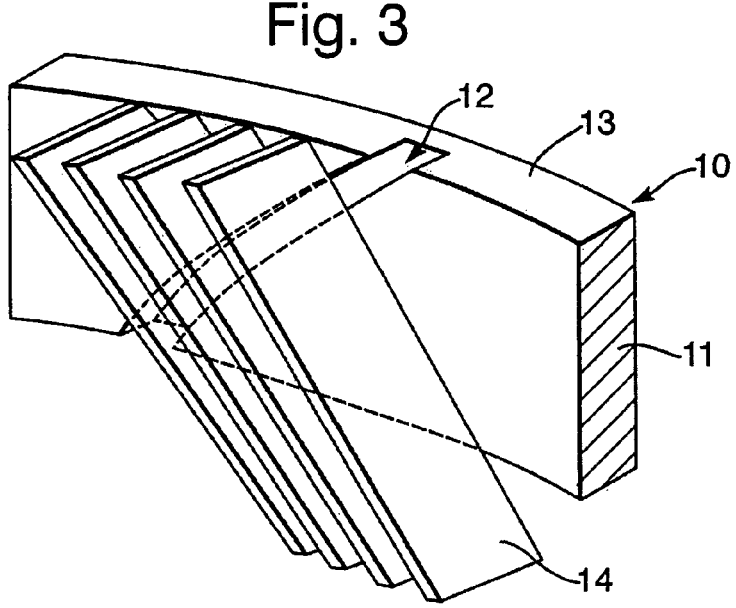
FIG. 3 is a schematic perspective view of a seal arrangement in accordance with aspects of the present invention.
Figure 4:
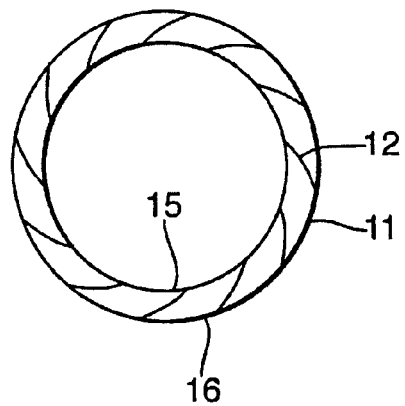
FIG. 4 is a schematic illustration of a housing plate in accordance with aspects of the present invention.

FIG. 4 illustrates a front schematic view of the plate 11 depicted in FIG. 3 illustrating a number of channels 12. As can be seen, the channels 12 are generally evenly distributed and take in the embodiment depicted a generally curved aspect from an inner edge 15 to an outer edge 16. However, it will also be understood that where desired for differential performance or for whatever reason, channels could be unevenly distributed dependent upon operational requirements.

Figure 5:
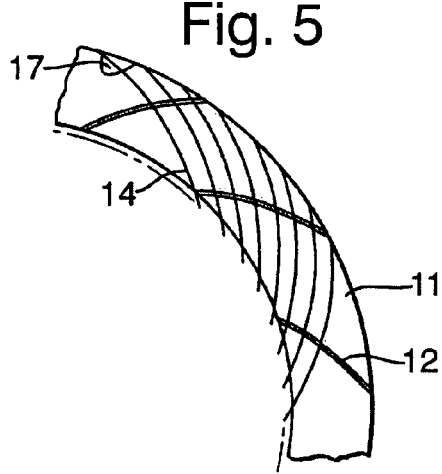
FIG. 5 is a schematic illustration showing a housing plate with seal elements in accordance with aspects of the present invention.

It will be appreciated that the relationship between the channels 12 and the seal elements 14 is important in order to ensure appropriate operation. Each seal element 14 will be relieved by at least one pressure channel 12. FIG. 5 provides a more detailed illustration of the relationship between the channels 12 in the plate 11 and seal elements 14. As can be seen, the channels 12 and elements 14 essentially cross with the angle of the channel 12 opposing the lay angle of the seal elements 14 to ensure that the leaves cannot become trapped in the channel 12. It will be understood if they were in the same orientation then as the blow-down pressure forces the leaves towards the plate 11 then the leaf may become engaged in a channel and so be unable to flex in use, or work themselves loose causing a significant degradation in the sealing effect provided.

The distribution of the channels 12 will depend upon the lay angle of the seal elements 14. As indicated above, generally each seal element 14 will be relieved by at least one channel 12 so that the steeper the lay angle 17 the more channels 12 will be required to provide pressure relief throughout the circumference of the seal arrangement. However, it is also true that too many channels will result in excessive leakage mass flow rates across the seal compromising the seal arrangement's effectiveness in operation. In such circumstances, either through analysis or other means, the correct number of channels 12 in relation to the seal elements and their lay angle 17 will be chosen for individual operational seal arrangement implementations.

In addition to simply lay angle, it will also be understood that the number of channels 12 will be dependent upon the aspect ratio of the seal elements, that is to say the length of the elements in comparison with their axial width and the packing density of the seal elements in the housing annulus of the arrangement. For a given lay angle 17 and hence seal element length the seal elements will be less inclined to move axially rearwards if they have a relatively large axial width, that is to say less acceptability to twisting in use. Similarly, greater seal element packing density, that is to say the number of elements per unit circumference, will result in a reduced likelihood of the seal elements twisting and therefore problems with respect to excessive blow-down forces.

It will be appreciated that the channels 12 in accordance with aspects of the present invention provide a minimum flow relief pathway in a seal arrangement.

As indicated above, generally the channels 12 will be chemically etched, electro-discharge machined or milled, dependent upon the required size and profile of each channel 12. Typically, the width and depth of the channels will be minimised to limit the increase in leakage mass flow rate through the seal. It will be understood that the available cross-sectional area at the rear of the arrangement is a determining factor with respect to mass flow rate. In normal use there will be a gap between the rear of the elements 14 and the surface 13 (FIG. 3) which avoids excess blow-down forces as described previously but nevertheless the inclusion of the channels 12 will add to the available area and therefore possibility for mass flow rate increase across the seal arrangement in accordance with aspects of the present invention.

The channels 12 in accordance with aspects of the present invention will not prevent movement of the seal elements axially rearwards into contact with the plate 11 but will limit excess blow-down forces occurring as a result of such movement.

Provision of channels in the plate 11 can take a multitude of forms provided there is only limited increase in mass flow rate across the seal arrangement in normal operation. FIGS. 3 to 5 illustrate the channel 12 as having a curved aspect from the inner side 15 to the outer side 16. This curved aspect provides an approximation towards a 90° angle of incidence between the seal elements 14 and the channels 12. It will be understood that the seal elements in the embodiment provided illustrates for illustration purposes also have a curved aspect. However, rather than being curved the channels in accordance with other aspects of the present invention may be straight or angled as appropriate dependent upon operational requirements and/or capabilities with respect to manufacture in the plate 11 in accordance with aspects of the present invention.

Consideration of mass flow rates across the seal arrangement are important. In such circumstances, the channels in accordance with aspects of the present invention may be appropriately configured to control such mass flow by adjustment in their width and/or length dependent upon pressure relief requirements with respect to the seal elements of the arrangement. It will also be understood that the depth of the channels may be varied along their length or width dependent upon requirements. For example, the depth of the channel at radial positions closer to the centre of the annulus plate 11 may be greater to reflect the increased volume flow at that position in comparison with parts of the channels more towards the peripheral outer edge of the annular plate 11. This increase in depth will reflect the increase in flow volume that builds up as it moves radially inward particularly when the leaf elements engage by axial displacement the plate of the housing incorporating the elements in accordance with aspects of the present invention.

Figure 6:
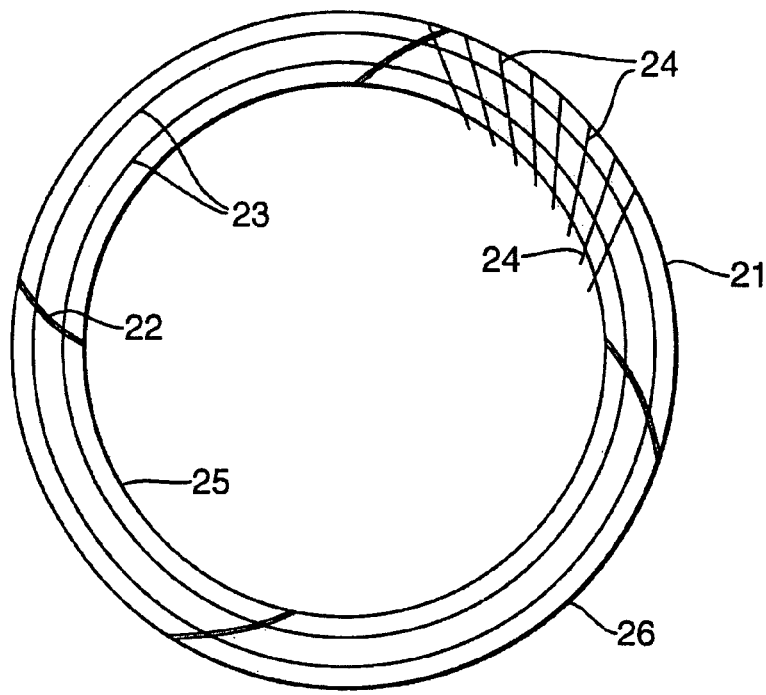
FIG. 6 is a front schematic view of an alternative seal arrangement in accordance with aspects of the present invention; and, FIG. 7 is a schematic front view of a further alternative embodiment of a seal arrangement in accordance with aspects of the present invention.

One approach to reducing the leakage mass flow rate across the seal arrangement would be to provide a smaller number of radially extending channels with annular ring channels extending around the plate. FIG. 6 illustrates this alternative embodiment of aspects of the present invention. Thus, a plate 21 incorporates radial channels 22 extending from an inner edge 25 to an outer edge 26 with annular channels 23 extending about the circumference of the plate 21. In such circumstances, each leaf 24 (only a proportion of the leaves 24 are provided for illustration purposes) will be relieved of excess blow-down pressure by one or more of the annular channels 23 which will then feed into a smaller number of radial channels 22, as described previously. Such an approach limits the increase in leakage mass flow across the seal.

Figure 7:
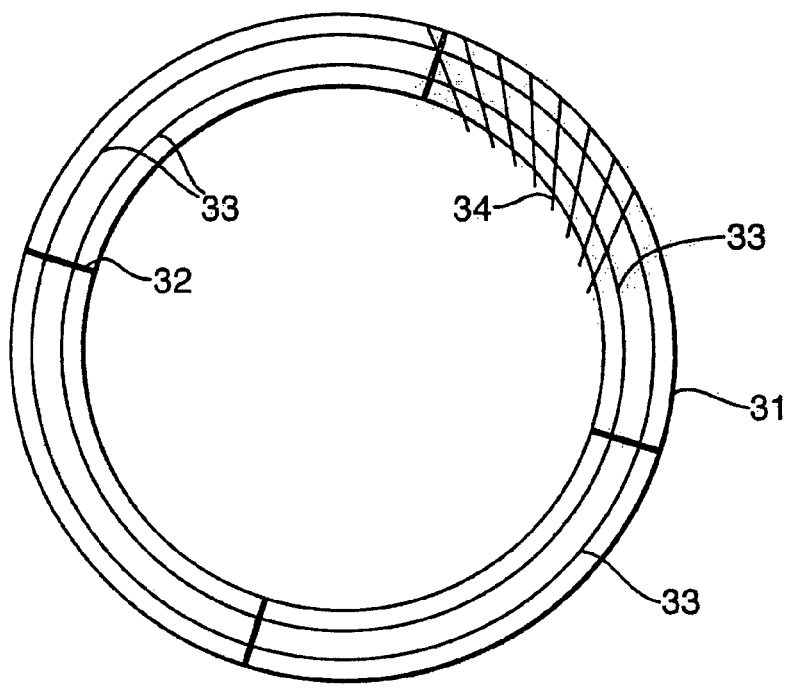

It will be noted that the channels 22 depicted in FIG. 6 still are essentially angularly presented between the inner and outer circumferences of the plate 21. FIG. 7 illustrates a further alternative in which the radial channels are straight and perpendicular to the edges of a plate 31. As with the embodiment depicted in FIG. 6 annular channels 33 are provided so that seal elements 34 (only a representative number of these elements are shown for illustration purposes) are again relieved by the annular channels 33 which then feed into a smaller number of straight perpendicularly presented channels 32 for excess blow-down force relief as described previously.

As indicated above, generally the seal elements in accordance with aspects of the present invention will take the form of leaf seal or bristle packs in brush seals of an aero or land based gas turbine engine as well as steam turbine engines. These seal arrangements act to divide high and low pressure zones to facilitate engine operation. By providing channels in accordance with aspects of the present invention described above, generally in the low pressure side plate of a housing accommodating the seal elements, excess blow-down pressures are avoided at the expense of potentially the normal levels of seal leakage being slightly increased. Generally, as illustrated, the channels in accordance with aspects of the present invention will be continuous either across the angular plate or in the form of angular rings about that plate. However, where appropriate it will be understood that the channels may be segmented or truncated to create branches which feed into a channel pattern or network for pressure relief with respect to blow-down forces as described previously. In such circumstances, excess blow-down force may be avoided with further limitation with respect to the mass flow across the seal element arrangement constituting leakage in normal operation. Furthermore, by providing variation in the depth of the channels it will again be understood that constriction in flow may be provided resisting mass flow rate across the seal arrangement. It will also be understood that the channels may incorporate gate segments comprising upstanding elements across each channel reducing the depth of that channel available for flow over the obstruction.

Edges of the channels may incorporate lips to hold the seal elements slightly off the channels in order to further facilitate pressure relief in use.

The number and distribution of the channels in accordance with aspects of the present invention will depend upon operational requirements. Thus, there may be one, two or more angular ring channels and the number of radial component channels provided will depend upon ensuring that each seal element is relieved by at least one association with a channel in accordance with aspects of the present invention.

I claim:
1. A seal arrangement comprising:
an annular housing; and
a plurality of leaf seal members arranged annularly, at least a portion of each leaf seal member extending into the housing, the housing defining a higher pressure region and a lower pressure region that is opposite the higher pressure region, the housing including:
at least one high pressure annular plate adjacent to the higher pressure region; and
at least one low pressure annular plate adjacent to the lower pressure region, wherein:
the at least one low pressure annular plate defines a plurality of curved channels each extending laterally across, and associated with, more than one leaf seal member, the channel being in flow communication with the lower pressure region at the distal end to the housing,
the at least one low pressure annular plate defines a land between each of the channels, a substantial minority of a height of each of the leaf seal members being immediately adjacent to at least one channel, and a substantial majority of the height of each of the leaf seal members being adjacent at least one corresponding land, and
the at least one low pressure annular plate having a top surface and a bottom surface and the plurality of curved channels extend from the top surface to the bottom surface.

2. The arrangement of claim 1 wherein the arrangement is for a rotating shaft and the seal members are disposed at an angle relative to the shaft.

3. The arrangement of claim 1 wherein the channel extends radially.

4. The arrangement of claim 1 wherein the channel incorporates annular parts.

5. The arrangement of claim 4 wherein the annular parts include complete annular rings in the housing.

6. The arrangement of claim 1 wherein the channel has an angle in an opposed direction to an angle of the seal members.

7. The arrangement of claim 1 wherein the channel and the seal members are arranged to lay across each other at a desired angle.

8. The arrangement of claim 7 wherein the desired angle is substantially 90°.

9. The arrangement of claim 1 wherein the channel has a variable depth into the plate along the channel's length.

10. The arrangement of claim 9 wherein the channel has a variable depth into the plate across the channel's width.

11. The arrangement of claim 1 wherein the channel has a variable width.

12. The arrangement of claim 1 wherein the channel is located in a rearward plate of the housing.

13. The arrangement of claim 1 wherein the channel has a lip edge.

14. A turbine engine incorporating the seal arrangement of claim 1.

15. A seal arrangement comprising:
a plurality of leaf seal members arranged annularly; and
an annular housing that encloses at least a portion of each leaf seal member and defines a lower pressure region and a higher pressure region,
the housing including a low pressure annular plate adjacent the lower pressure region and a high pressure annual plate adjacent to the higher pressure region, the plate defining a plurality of curved channels extending across the plate with a land between each of the channels and being laterally adjacent to more than one of the leaf seal members, a substantial minority of the height of a majority of the leaf seal members being immediately adjacent to at least one channel, and a substantial majority of the height of the majority of the leaf seal members being adjacent to at least one corresponding land, and the low pressure annular plate having a top surface and a bottom surface and the plurality of curved channels extend from the top surface to the bottom surface.

* * * * *